United States Patent
Bhargava et al.

(10) Patent No.: US 12,287,699 B2
(45) Date of Patent: Apr. 29, 2025

(54) CONVERSION OF MESSAGES INTO AUDIO FORMAT

(71) Applicant: Dell Products L.P., Round Rock, TX (US)

(72) Inventors: Vivek Bhargava, Bangalore (IN); Vaideeswaran Ganesan, Bengaluru (IN); Rishav Sethia, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 440 days.

(21) Appl. No.: 17/869,269

(22) Filed: Jul. 20, 2022

(65) Prior Publication Data

US 2024/0028436 A1 Jan. 25, 2024

(51) Int. Cl.
| | |
|---|---|
| *G10L 13/00* | (2006.01) |
| *G06F 3/16* | (2006.01) |
| *G06F 11/07* | (2006.01) |
| *G06F 40/242* | (2020.01) |
| *G06F 40/253* | (2020.01) |

(52) U.S. Cl.
CPC .......... *G06F 11/0769* (2013.01); *G06F 3/162* (2013.01); *G06F 40/242* (2020.01); *G06F 40/253* (2020.01); *G10L 13/00* (2013.01)

(58) Field of Classification Search
CPC .. G06F 11/0769; G06F 40/253; G06F 40/242; G06F 3/162; G10L 13/00; G10L 13/02; G10L 15/26; G10L 13/08; G10L 13/04; G10L 13/033; G10L 13/07; G10L 13/10
See application file for complete search history.

(56) References Cited

U.S. PATENT DOCUMENTS

| | | | | |
|---|---|---|---|---|
| 8,600,368 | B2 * | 12/2013 | Shaw | H04W 4/18 |
| | | | | 455/418 |
| 11,335,340 | B2 * | 5/2022 | Shin | G10L 15/26 |
| 2018/0239495 | A1 * | 8/2018 | Sharifi | G06F 40/295 |
| 2019/0206385 | A1 * | 7/2019 | Avital | H04L 51/063 |

(Continued)

OTHER PUBLICATIONS

C. Mathers, "The Learning Retention Pyramid: A Simple Guide," https://www.developgoodhabits.com/learning-pyramid/, Apr. 1, 2020, 18 pages.

(Continued)

*Primary Examiner* — Abdelali Serrou
(74) *Attorney, Agent, or Firm* — Ryan, Mason & Lewis, LLP

(57) ABSTRACT

An apparatus comprises a processing device configured to obtain one or more messages, the one or more messages being associated with management of a given one of one or more information technology assets in an information technology infrastructure, and to determine, based at least in part on content of a given one of the one or more messages, whether the given message is suitable for delivery in an audio format. The processing device is also configured, responsive to determining that the given message is suitable for delivery in the audio format, to convert the content of the given message into one or more audio messages. The processing device is further configured to select one or more audio output devices for delivery of the one or more audio messages, and to provide, to the selected one or more audio output devices, the one or more audio messages.

20 Claims, 5 Drawing Sheets

(56) References Cited

U.S. PATENT DOCUMENTS

| | | | | |
|---|---|---|---|---|
| 2019/0236492 | A1* | 8/2019 | Saha | G06F 40/295 |
| 2019/0372925 | A1* | 12/2019 | Duchastel | H04L 51/42 |
| 2020/0105246 | A1* | 4/2020 | Brake | G10L 15/26 |
| 2020/0175974 | A1* | 6/2020 | Trim | G10L 13/00 |
| 2020/0175984 | A1* | 6/2020 | Iwasa | G10L 15/22 |
| 2020/0357227 | A1* | 11/2020 | Wu | G10L 15/22 |
| 2021/0082407 | A1* | 3/2021 | Kim | G06F 40/40 |
| 2021/0366459 | A1* | 11/2021 | Sharifi | G10L 13/08 |
| 2023/0317055 | A1* | 10/2023 | Xu | G10L 13/04 |
| | | | | 704/258 |
| 2023/0376327 | A1* | 11/2023 | Knapp | G06F 9/453 |

OTHER PUBLICATIONS

M. Zaib et al., "A Short Survey of Pre-trained Language Models for Conversational AI-A New Age in NLP," Association for Computing Machinery, arXiv:2104.10810v1, Apr. 22, 2021, 7 pages.

L. P. Kaelbling et al., "Reinforcement Learning: A Survey," Journal of Artificial Intelligence Research, vol. 4, May 1996, pp. 237-285.

J. Pensar et al., "Labeled Directed Acyclic Graphs: A Generalization of Context-Specfic Independence in Directed Graphical Models," arXiv:1310.1187v1, Oct. 4, 2013, 26 pages.

J. Gao et al., "Neural Approaches to Conversational AI," Foundations and Trends in Information Retrieval, vol. 13, No. 2-3, Feb. 21, 2019, 64 pages.

M. Zaib et al., "Conversational Question Answering: A Survey," arXiv:2106.00874v2, Jun. 3, 2021, 46 pages.

P. Bhagat et al., "Initial Lessons from Building an IVR-based Automated Question-Answering System," International Conference on Information and Communication Technologies and Development, Jun. 17-20, 2020.

Dell Inc., "Dell Compellent Copilot Optimize Service," Copilot Optimize v1.1, Jun. 7, 2012, 7 pages.

Dell Technologies, "APEX," Brochure, Jul. 2020, 9 pages.

Dell Inc., "Dell Compellent Copilot Support," D344 Rev. 2.1, Dec. 2013, 3 pages.

A. Hauser et al., "Characterization and Greedy Learning of Interventional Markov Equivalence Classes of Directed Acyclic Graphs," Journal of Machine Learning Research, vol. 13, Aug. 2012, pp. 2409-2464.

Dell Technologies, "Dell CloudIQ: A Detailed Review," Technical White Paper, Jan. 2022, 159 pages.

P. M. Nadkarni et al., "Natural Language Processing: An Introduction," Journal of the American Medical Informatics Association, vol. 18, No. 5, Sep. 2011, pp. 544-551.

Penn Treebank, "Alphabetical List of Part-of-speech Tags Used in the Penn Treebank Project," https://www.ling.upenn.edu/courses/Fall_2003/ling001/penn_treebank_pos.html, Accessed Jul. 19, 2022, 1 page.

M. Oshry et al., "Voice Extensible Markup Language (VoiceXML) 2.1," https://www.w3.org/TR/2007/REC-voicexml21-20070619/, Jun. 19, 2007, 25 pages.

J. Jablonski, "Natural Language Processing with Python's NLTK Package," https://realpython.com/nltk-nlp-python/, Accessed Jul. 19, 2022, 25 pages.

* cited by examiner

CONVERSION OF MESSAGES INTO AUDIO FORMAT

FIELD

The field relates generally to information processing, and more particularly to management of information processing systems.

BACKGROUND

Support platforms may be utilized to provide various services for managed computing devices. Such services may include, for example, troubleshooting and remediation of issues encountered on computing devices managed by a support platform. This may include periodically collecting information on the state of the managed computing devices, and using such information for troubleshooting and remediation of the issues. Such troubleshooting and remediation may include receiving requests to provide servicing of hardware and software components of computing devices. For example, users of computing devices may submit service requests to a support platform to troubleshoot and remediate issues with hardware and software components of computing devices. Such requests may be for servicing under a warranty or other type of service contract offered by the support platform to users of the computing devices.

SUMMARY

Illustrative embodiments of the present disclosure provide techniques for conversion of messages into audio format.

In one embodiment, an apparatus comprises at least one processing device comprising a processor coupled to a memory. The at least one processing device is configured to perform the steps of obtaining one or more messages, the one or more messages being associated with management of a given one of one or more information technology assets in an information technology infrastructure, and determining, based at least in part on content of a given one of the one or more messages, whether the given message is suitable for delivery in an audio format. The at least one processing device is also configured to perform the step of, responsive to determining that the given message is suitable for delivery in the audio format, converting the content of the given message into one or more audio messages. The at least one processing device is further configured to perform the steps of selecting one or more audio output devices for delivery of the one or more audio messages, and providing, to the selected one or more audio output devices, the one or more audio messages.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
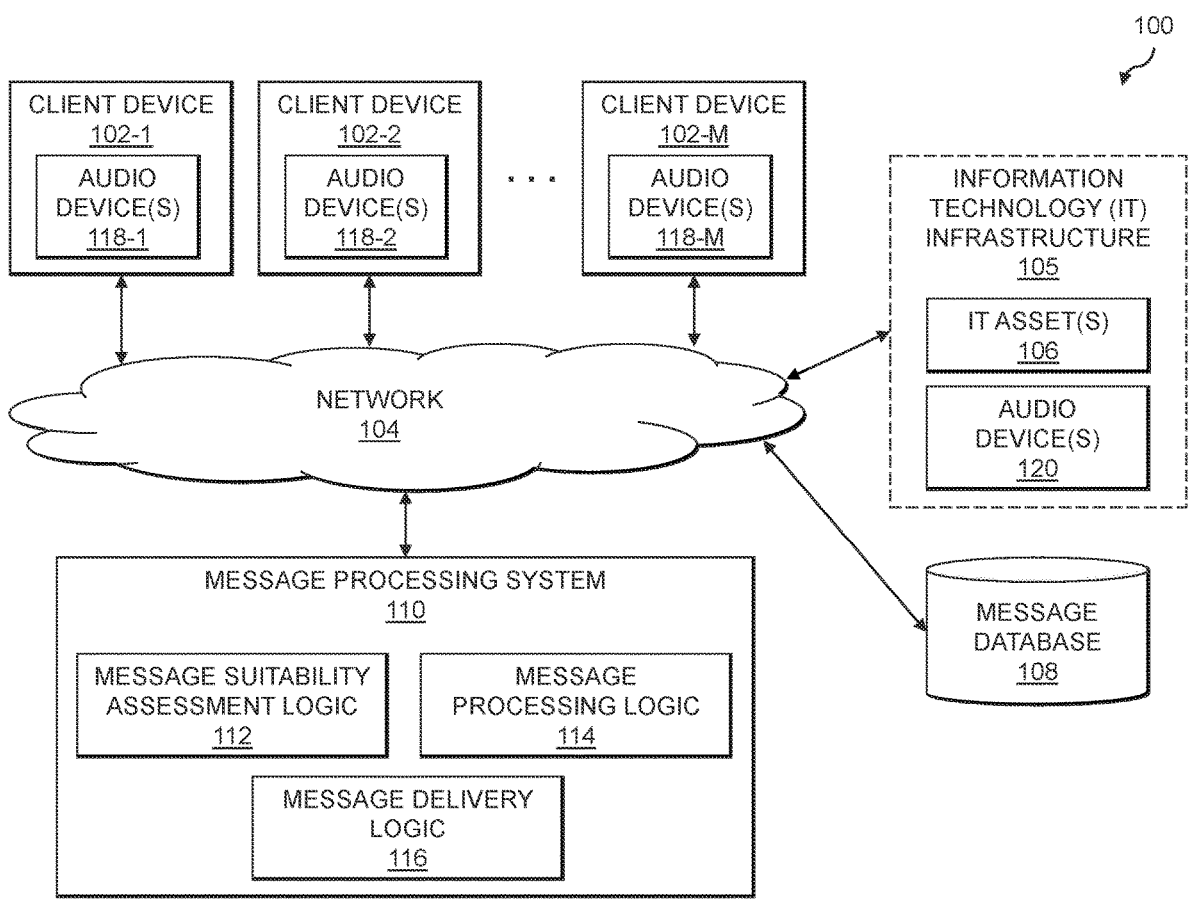
FIG. 1 is a block diagram of an information processing system configured for conversion of messages into audio format in an illustrative embodiment.

FIG. 1 shows an information processing system 100 configured in accordance with an illustrative embodiment. The information processing system 100 is assumed to be built on at least one processing platform and provides functionality for conversion of messages (e.g., computer-generated notifications) into human-friendly audio form. The system 100 includes a set of client devices 102-1, 102-2, . . . 102-M (collectively, client devices 102) which are coupled to a network 104. Also coupled to the network 104 is an information technology (IT) infrastructure 105 comprising one or more IT assets 106, a message database 108, and a message processing system 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc. The client devices 102-1, 102-2, . . . 102-M are associated with respective sets of one or more audio devices 118-1, 118-2, . . . 118-M (collectively, audio devices 118). The IT infrastructure 105 is also associated with a set of one or more audio devices 120. The audio devices 118 may comprise, for example, speakers of the client devices 102, headphones or other audio output devices connected to the client devices 102, various audio output devices in or around the client devices 102, etc. The audio devices 120 may similarly comprise speakers or various other audio output devices that are part of the IT assets 106 of the IT infrastructure, which are in or around the IT assets 106 of the IT infrastructure, etc.

The IT assets 106 of the IT infrastructure 105 may host applications that are utilized by respective ones of the client devices 102, such as in accordance with a client-server computer program architecture. In some embodiments, the applications comprise web applications designed for delivery from assets in the IT infrastructure 105 to users (e.g., of client devices 102) over the network 104. Various other examples are possible, such as where one or more applications are used internal to the IT infrastructure 105 and not exposed to the client devices 102.

The message processing system 110 utilizes various information stored in the message database 108 for conversion of computer-generated notifications or messages into human-friendly format. Such computer-generated notifications may include, for example, instructions for performing servicing of the IT assets 106 in the IT infrastructure 105. In some embodiments, the message processing system 110 is used for an enterprise system. For example, an enterprise may subscribe to or otherwise utilize the message processing system 110 for converting computer-generated notifications (e.g., generated by ones of the IT assets 106) into audio messages that take into account human limitations for processing audio content. Such converted audio messages are then provided to target users (e.g., of client devices 102) for playback (e.g., using audio devices 118 and/or audio devices 120) to facilitate servicing of the IT assets 106.

As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different business, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The message database 108, as discussed above, is configured to store and record various information that is used by the message processing system 110 for converting computer-generated notifications into audio messages (e.g., for use in testing, servicing, configuring or otherwise managing the IT assets 106, applications or other software running on the IT assets 106, etc.). Such information may include, but is not limited to, information regarding previously processed messages, dictionaries or other data stores for processing jargon and simplifying terms in the computer-generated notifications, etc. The message database 108 in some embodiments is implemented using one or more storage systems or devices associated with the message processing system 110. In some embodiments, one or more of the storage systems utilized to implement the message database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the message processing system 110, as well as to support communication between the message processing system 110 and other related systems and devices not explicitly shown.

The client devices 102 are configured to access or otherwise utilize the IT infrastructure 105. In some embodiments, the client devices 102 are assumed to be associated with system administrators, IT managers or other authorized personnel responsible for managing the IT assets 106 of the IT infrastructure 105 (e.g., where such management includes performing testing, servicing, configuration or other management of the IT assets 106, or of applications or other software that runs on the IT assets 106). For example, a given one of the client devices 102 may be operated by a user to access a graphical user interface (GUI) provided by the message processing system 110 to manage conversion of computer-generated notifications into human-friendly audio format. The message processing system 110 may be provided as a cloud service that is accessible by the given client device 102 to allow the user thereof to manage conversion of computer-generated notifications into human-friendly audio format. In some embodiments, the IT assets 106 of the IT infrastructure 105 are owned or operated by the same enterprise that operates the message processing system 110 (e.g., where an enterprise such as a business provides support for the assets it operates). In other embodiments, the IT assets 106 of the IT infrastructure 105 may be owned or operated by one or more enterprises different than the enterprise which operates the message processing system 110 (e.g., a first enterprise provides support for assets that are owned by multiple different customers, business, etc.). Various other examples are possible.

In other embodiments, the message processing system 110 may provide support for generating consolidated message bulletins for delivery to the client devices 102, instead of or in addition to providing management of the IT assets 106 of the IT infrastructure 105. For example, the message processing system 110 may be operated by a vendor that manufactures and sells various products (e.g., possibly including the IT assets 106 or applications or other software that run on the IT assets 106), with the message bulletins including information for different product launches, sales or marketing events, etc. The message processing system 110, however, is not required to be operated by any single product vendor. Instead, the message processing system 110 may be offered as a service to provide support for products that are offered by any number of product vendors. The client devices 102 may subscribe to the message processing system 110, so as to provide support for rollout of the products offered by such vendors. Various other examples are possible.

In some embodiments, the client devices 102 and/or IT assets 106 may implement host agents that are configured for automated transmission of information (e.g., computer-generated notifications) that are to be converted into human-friendly audio format. Such host agents may also or alternatively be configured to automatically receive from the message processing system 110 such converted audio messages for output on associated ones of the audio devices 118 and/or audio devices 120. It should be noted that a "host agent" as this term is generally used herein may comprise an automated entity, such as a software entity running on a processing device. Accordingly, a host agent need not be a human entity.

The message processing system 110 in the FIG. 1 embodiment is assumed to be implemented using at least one processing device. Each such processing device generally comprises at least one processor and an associated memory, and implements one or more functional modules or logic for controlling certain features of the message processing system 110. In the FIG. 1 embodiment, the message processing system 110 comprises message suitability assessment logic 112, message processing logic 114, and message delivery logic 116. The message suitability assessment logic 112 is configured to receive computer-generated notifications or other messages, and determine their suitability for conversion into audio messages. The message processing logic 114 is configured to apply various preprocessing to the messages determined to be suitable for conversion into audio messages. Such preprocessing may include replacing technical jargon with simpler terms, simplifying nouns or other object terms in the messages into more human-friendly terms, etc. The content of the messages may also be converted into statements or sentences in imperative form with simple action steps to be taken by users (e.g., to perform testing, servicing, configuration or other management of the IT assets 106). The message delivery logic 116 is configured to deliver the processed audio messages to suitable ones of the audio devices 118 and 120 (e.g., based on a location of the user that is to perform testing, servicing, configuration or other management of the IT assets 106, device and delivery preferences of the user, etc.).

It is to be appreciated that the particular arrangement of the client devices 102, the IT infrastructure 105 and the message processing system 110 illustrated in the FIG. 1 embodiment is presented by way of example only, and alternative arrangements can be used in other embodiments. As discussed above, for example, the message processing system 110 (or portions of components thereof, such as one or more of the message suitability assessment logic 112, the message processing logic 114, and the message delivery logic 116) may in some embodiments be implemented internal to one or more of the client devices 102 and/or the IT infrastructure 105.

At least portions of the message suitability assessment logic 112, the message processing logic 114, and the message delivery logic 116 may be implemented at least in part in the form of software that is stored in memory and executed by a processor.

The message processing system 110 and other portions of the system 100, as will be described in further detail below, may be part of cloud infrastructure.

The message processing system 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the message database 108 and the message processing system 110 or components thereof (e.g., the message suitability assessment logic 112, the message processing logic 114, and the message delivery logic 116) may be implemented on respective distinct processing platforms, although numerous other arrangements are possible. For example, in some embodiments at least portions of the message processing system 110 and one or more of the client devices 102, the IT infrastructure 105 and/or the message database 108 are implemented on the same processing platform. A given client device (e.g., 102-1) can therefore be implemented at least in part within at least one processing platform that implements at least a portion of the message processing system 110.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 102, the IT infrastructure 105, IT assets 106, the message database 108 and the message processing system 110, or portions or components thereof, to reside in different data centers. Numerous other distributed implementations are possible. The message processing system 110 can also be implemented in a distributed manner across multiple data centers.

Additional examples of processing platforms utilized to implement the message processing system 110 and other components of the system 100 in illustrative embodiments will be described in more detail below in conjunction with FIGS. 4 and 5.

It is to be appreciated that these and other features of illustrative embodiments are presented by way of example only, and should not be construed as limiting in any way.

It is to be understood that the particular set of elements shown in FIG. 1 for conversion of messages into audio format is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for conversion of messages into audio format will now be described in more detail with reference to the flow diagram of FIG. 2. It is to be understood that this particular process is only an example, and that additional or alternative processes for conversion of messages into audio format may be used in other embodiments.

In this embodiment, the process includes steps 200 through 208. These steps are assumed to be performed by the message processing system 110 utilizing the message suitability assessment logic 112, the message processing logic 114, and the message delivery logic 116. The process begins with step 200, obtaining one or more messages, the one or more messages being associated with management of a given one of one or more of the IT assets 106 in the IT infrastructure 105.

In step 202, a determination is made as to whether a given one of the one or more messages is suitable for delivery in an audio format based at least in part on content of the given message. Step 202 may include determining that the given message is not suitable for delivery in the audio format responsive to at least one of: determining that the given message comprises an operational message without action steps; determining that the given message comprises a non-actionable information message; determining that the given message comprises partial instructions for an action to be taken for management of the given IT asset; determining that the content of the given message comprises an amount of technical jargon terms exceeding a designated technical jargon threshold; determining that the content of the given message comprises an amount of information exceeding a designated information threshold; and determining that a complexity of one or more sentences in the given message exceeds a designated complexity threshold. Step 202 may include determining that the given message is suitable for delivery in the audio format responsive to at least one of: determining that the content of the given message comprises an instruction message calling out one or more specific actions for management of the given IT asset; and determining that the content of the given message comprises an actionable information message. Step 202 may also or alternatively include determining that the given message is suitable for delivery in the audio format responsive to determining that the content of the given message comprises information associated with at least one of a product launch of the given IT asset and a sales marketing event associated with the given IT asset.

In step 204, responsive to determining that the given message is suitable for delivery in the audio format, the content of the given message is converted into one or more audio messages. Step 204 may comprise identifying one or more technical jargon terms in the content of the given message and replacing the identified one or more technical jargon terms with one or more non-technical jargon terms. The one or more non-technical jargon terms are mapped to the identified one or more technical jargon terms in a jargon processing dictionary. The jargon processing dictionary is built utilizing a reinforcement learning algorithm that analyzes a set of reference assets related to a technical domain determined from analysis of a transactional context of the given message and the given IT asset.

Step 204 may also or alternatively comprise identifying one or more action verbs in the content of the given message and utilizing an action verb dictionary to map the identified one or more action verbs to one or more action types. The one or more action types comprise: at least a first action type representing a desired operational end state of the given IT asset; at least a second action type representing a failed non-operational end state of the given IT asset; at least a third action type representing lifecycle operations for the given IT asset; at least a fourth action type representing manual operations to be performed on the given IT asset; and at least a fifth action type representing automated scriptable operations to be performed on the given IT asset.

Step 204 may further or alternatively comprise identifying one or more entity names in the content of the given message and replacing the identified one or more entity names with one or more entity type tokens in an entity name dictionary. The entity name dictionary is built utilizing a reinforcement learning algorithm that analyzes a set of reference assets related to a technical domain determined from analysis of a transactional context of the given message and the given IT asset.

In some embodiments, step 204 comprises splitting the given message into one or more sentences based at least in part on one or more designated boundaries, the one or more designated boundaries comprising punctuation marks and conjunctions, and, for a given one of the one or more sentences: utilizing one or more natural language processing algorithms to identify parts of speech of the terms in that sentence; selecting a primary action verb in that sentence based at least in part on a transactional context of the given message and the given IT asset; and determining an action type of the selected primary verb in that sentence. Step 204 may further comprise, responsive to the action type of the selected primary verb representing a desired operational end state of the given IT asset, generating a given one of the one or more audio messages indicating that the given IT asset is in the desired operational end state. Step 204 may further comprise, responsive to the action type of the selected primary verb representing a failed non-operational end state of the given IT asset: determining one or more recovery steps for restoring the given IT asset to the desired operational end state; determining a recovery time by which the given IT asset is to be restored to the desired operational end state; and generating a given one of the one or more audio messages indicating the determined one or more recovery steps and the determined recovery time.

Step 204 may also or alternatively comprise consolidating the content of the given message with one or more other ones of the one or more messages into a message bulletin, where the given message and the one or more other ones of the one or more messages are selected based at least in part on determining one or more topics of interest for a given user. The message bulletin may comprise a status report for management actions performed on the given IT asset.

Figure 2:
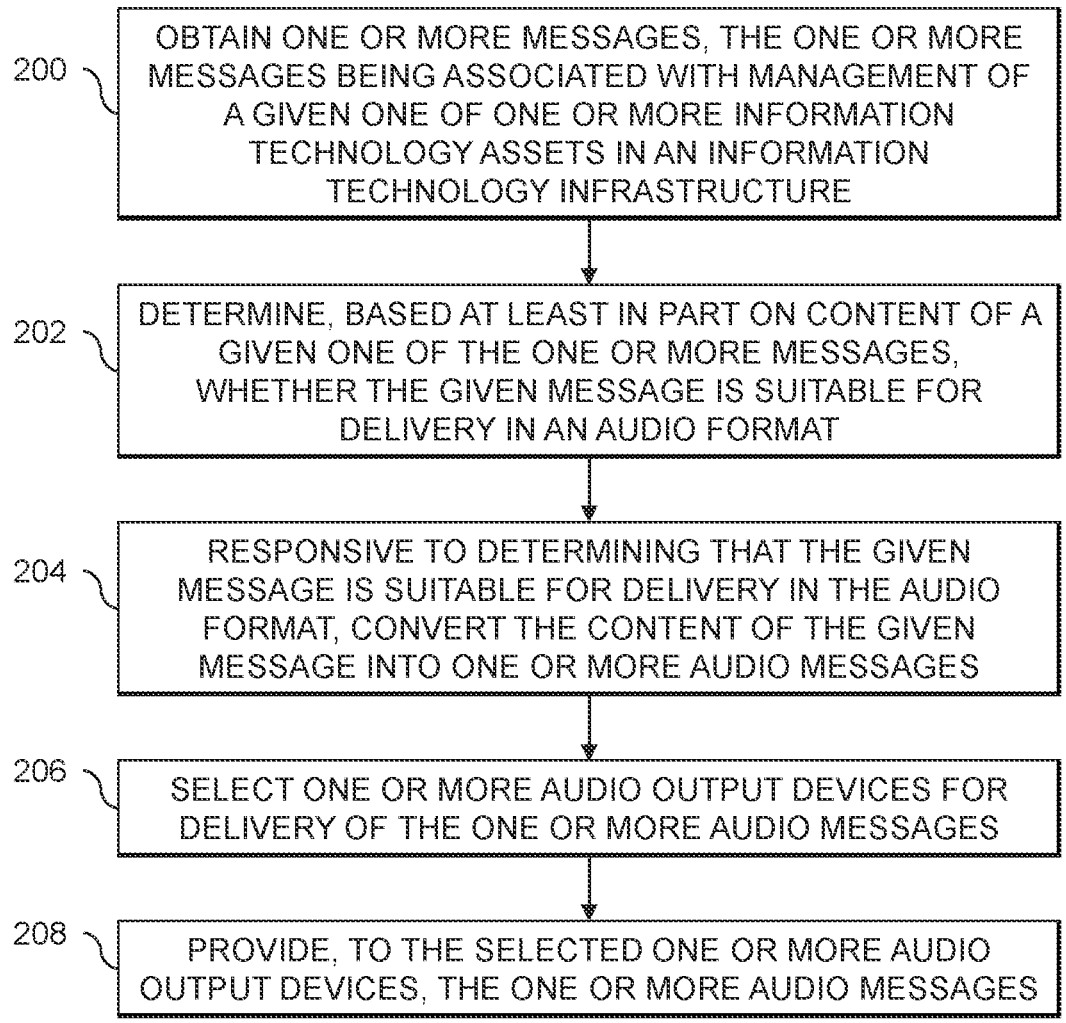
FIG. 2 is a flow diagram of an exemplary process for conversion of messages into audio format in an illustrative embodiment.

The FIG. 2 process continues with step 206, selecting one or more audio output devices for delivery of the one or more audio messages. In step 208, the one or more audio messages are provided to the selected one or more audio output devices. At least one of the selected one or more audio output devices comprises at least one of: a client device associated with a user responsible for management of the given IT asset; the given IT asset; and one or more other IT assets in the IT infrastructure within a designated threshold distance of the given IT asset.

Currently, artifacts, notifications or other messages related to business processing and infrastructure management (e.g., message guides, recommended actions, recovery steps, business processes, escalation procedures, error messages and handling, computer-generated notifications, etc.) are assumed to be read by humans. Thus, even with significant machine-level automation being performed inside a data center or other portion of IT infrastructure, there are many situations which still require manual human intervention.

Illustrative embodiments provide technical solutions for minimizing or reducing the need for such manual human intervention to the greatest degree possible, while keeping the sense of urgency and closure towards a desired intent to achieve desired goals as demonstrated by humans in resolving issues. When manual human intervention is required, the technical solutions described herein provide approaches for making messages or notifications to the user as clear and unambiguous as possible for the user performing the manual human intervention. This may include, for example, ensuring that messages be imperative rather than declarative or informational, reducing the usage of jargon and ambiguous words and actions, etc. The technical solutions described herein further seek manual human intervention in such a way that the manual human intervention involves just enough (e.g., as little as possible) decision making and/or action from the user performing the manual human intervention. In these cases, it is assumed that a system has the knowledge of what needs to be done in order to guide the user towards successful resolution of issues.

Consider, as an example, a user that would like to receive personalized, localized and accessibility-friendly audio notifications or messages for events of interest on a preferred audio device, where such notifications or messages give very specific instructions. This is essential in cases where a machine (e.g., an IT asset in an IT infrastructure) requires manual human intervention to complete a task. In such cases, the decision taken by the machine requires at least partial manual human action to achieve the task. Since the knowledge is assumed to be with the machine (or some other system such as a support system associated with the machine or a data center or other IT infrastructure in which the machine is housed), the user is guided to execute whatever actions are needed to achieve the task in a way which does not require the user to have significant expertise.

Currently, audio messages or notifications are assumed to be heard by the target user. Users, however, may have very low retention and hearing for understanding audio messages and cannot retain complex sentences when delivered in audio format. Thus, it is important that the audio messages are generated in such a way that users will be able to take actions quickly. This requires the audio messages to be simple and actionable, and that the specific actions to be taken should be easy for the user to execute. If there are multiple steps to a particular action, then the user should be guided through the multiple steps until the entire process is complete. The audio messages should be easy to act upon, unambiguous, and something that the user does not need to repeatedly replay for remembering the content.

As another example, for sales and marketing promotional events, some users may like to have a regular notification or message bulletin (e.g., that consolidates events and provides them at regular intervals) while other users (e.g., executives or supervisors) may like to have a regular consolidated bulletin (e.g., that may consolidate events across supervised users, potentially at less frequent regular intervals). Such bulletins may be provided in audio form as one or more audio messages, which are useful in various situations where video content is distracting (e.g., when a user is driving, walking, moving inside a data center, etc.).

Illustrative embodiments provide technical solutions for converting messages into actionable audio messages that are consistent with audio retention aspects of humans. Various issues relating to human audio retention are described above and below. To mitigate such issues, the technical solutions described herein perform various processing of messages and notifications, including: assessing messages and notifications for suitability of audio processing; excluding non-actionable, informational and complex messages from audio processing; and performing various audio processing for such suitable and non-excluded messages. The audio processing may include, but is not limited to: replacing jargon with user-understandable terms; converting statements into action-oriented sentences (e.g., starting with a verb and then having simple nouns consistent with what a target user will understand); for failed operations, identifying recovery steps; simplifying recovery steps into human-actionable entities; determining when actions are to be completed by using service level agreements (SLAs); determining an execution sequence of actions in which corresponding audio messages are sent to users, with timeouts being guided by the SLAs; for sales and marketing events (e.g., product launches, sales drives, etc.), collecting messages and converting them into regular bulletins; etc. For such audio processing, data may be gathered from various resources, including dictionaries, historical data, lookup tables, etc.

In some embodiments, a goal is to convert messages and notifications from machines that need manual human intervention into actionable audio messages. The challenges with such conversion, however, include: that humans have very low retention while hearing audio messages and cannot retain complex sentences; that long messages, phrases and complex structures (e.g., with more than 5 to 10 words) could be difficult to remember or process; that non-actionable messages require humans to explore what action should be performed, which would require users to look for alternate mechanisms (e.g., Internet searches, manuals, reaching out to colleagues, etc.) to resolve the situation, where it is desired that users should not need to interpret the messages before acting; etc. Unfortunately, most messages, notifications, resolutions steps and recommendations which are written by humans are not written or designed for delivery via audio-enabled devices. Such messages contain the complexity of human language, and can require significant domain expertise to understand. For example, different enterprises (e.g., competitors, developers, etc.) may use different terms for the same object based on their context, and hence the receiver would require the context and knowledge to properly interpret the messages.

The technical solutions described herein may be triggered or initiated in response to various conditions, such as when a machine realizes that certain steps or actions must be performed or supported by a human via manual intervention (e.g., removing a disk, replacing a disk, etc.). The machine can use the technical solutions described herein to simplify messages into action-oriented steps that do not require skilled or expert users to perform the manual intervention. The technical solutions may take as input system-generated messages which are to be processed into imperative (e.g., action-oriented) messages for delivery to users. The imperative messages should be atomic (e.g., simple, and requiring only one task at a time) and easy to understand (e.g., devoid of jargon so that the user does not need significant skill or domain expertise). The user should also be provided information as to when actions should be completed (e.g., a "need by" time) to communicate a sense of urgency and help the users prioritize tasks. Messages delivered via auditory interfaces should also satisfy the low retention capability of humans with respect to audio as described herein.

In some embodiments, it is assumed that the notifications or messages of interest for a user, as well as the preferred device for delivery of such messages, have been identified. If the preferred device has audio capabilities, the technical solutions described herein are triggered. Certain messages are not well-suited for audio purposes, such as intermediate information text and messages that require complex actions. Many messages, however, can be translated or converted into audio notifications using the technical solutions described herein. Messages may be first assessed for the suitability for conversion or processing into audio notifications, and suitable messages may be processed as described herein.

Notifications are assessed for their suitability for conversion into and delivery as audio messages. Since retention of audio is less than other forms, it is important to ensure that the information carried in audio messages addresses such limitations. Various messages and categories of messages are generally not suitable for audio delivery, and may be rejected at the suitability assessment stage. The following are types or categories of messages which are generally not suitable for audio delivery: operational messages or messages that do not have actions in them; messages that have too much technical jargon or too much information (e.g., "Background initialization completed."; "Disk in Bay 1 of Backplane 2 in Enclosure 5 of Server abc.def.ghi.com rebuild has failed. Contact system administrator."; "4 burn failures on Server 1 Rack 4."; etc.); messages that have complicated sentences, such as messages with too many phrases, too many conjugations, etc. (e.g., "Unable to configure the drive because there was no sufficient license and the slot in which the drive was added is not supported by PHE matrix."); non-actionable information messages, where the aspects of "so what" or "what am I supposed to do now?" elements are missing (e.g., "The drive has reached a normal state."; "The job has succeeded with partial errors."; etc.); messages that give partial instructions (e.g., "Reinsert drive."); etc.

There are also many types or categories of messages which are generally suitable for audio delivery, including but not limited to: simple instruction messages (e.g., "Replace the drive and restart the system."); simple messages without or with minimal jargon that also state whether tasks are completed (e.g., "Virtual Drive has been restored and is now online. System is OK."); simple messages that call out specific actions (e.g., "Virtual Drive rebuild has failed. Call Administrator to look into issue."); simple messages that call actions with time limitations (e.g., "Virtual Drive is offline as rebuild failed. Need to restore in 2 hours."); etc. Further, there are various types or categories of messages which are suitable for audio delivery with some additional preprocessing, including but not limited to: messages with multiple actions which lead to retention issues, as a user may only retain one or two actions at a time (e.g., "Plug out the drive, plug in the new drive, restart the system, open a support console, and check if drive is recognized."); etc. These types of messages may be split into sequences of multiple messages which are sent to an audio device (e.g., with some configurable delay between the messages, where the delay may be dynamically adjusted based on an expected time required to complete different actions in the sequence or when individual actions are detected to be completed). Still further, there are various types or categories of messages which are suitable for audio delivery as bulletins, which can be consolidated and replayed to users at regular intervals, including: product launch messages; sales and marketing event messages; etc.

Figure 3:
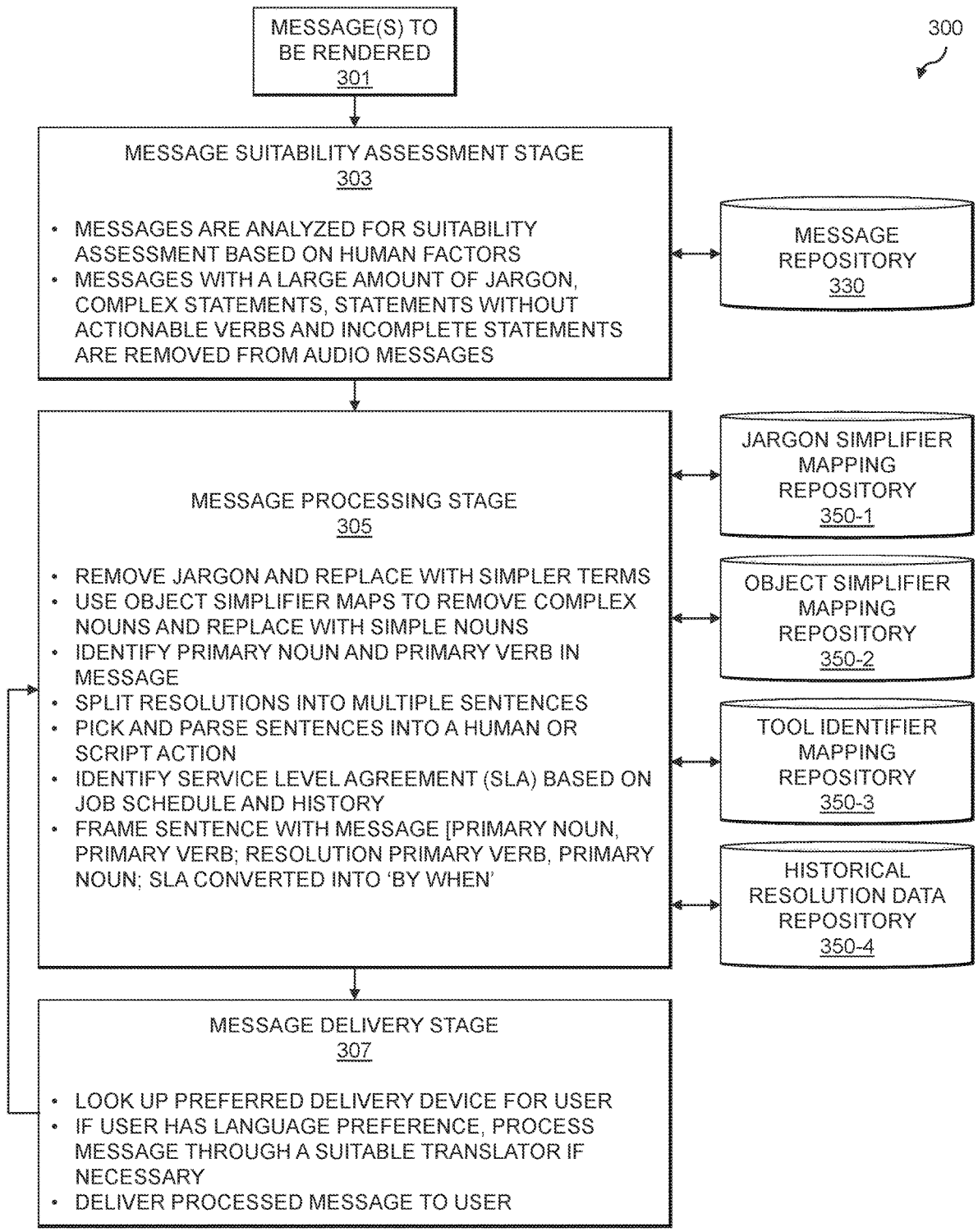
FIG. 3 shows a system flow for message processing in an illustrative embodiment.

FIG. 3 shows a system flow 300 for message processing, in which messages 301 to be rendered are passed through three processing stages, a message suitability assessment stage 303 (e.g., implemented using message suitability assessment logic 112), a message processing stage 305 (e.g., implemented using message processing logic 114), and a message delivery stage 307 (e.g., implemented using message delivery logic 116). Various information may be used in the different stages 303, 305 and 307, with such information being stored in different repositories including a message repository 330, a jargon simplifier mapping repository 350-1, an object simplifier mapping repository 350-2, a tool identifier mapping repository 350-3 and a historical resolution data repository 350-4. These repositories may form a part of the message database 108 described above.

The messages 301 may comprise textual content, which is to be converted into one or more audio messages for delivery to a user. As will be described in further detail below, the messages 301 (after processing in the message suitability assessment stage 303 and the message processing stage 305) are converted into audio messages in the message delivery stage 307. This may include, for example, taking processed textual content of the messages 301 and using text-to-speech tools to convert the processed textual content into one or more audio messages for delivery to the user.

To begin, the messages 301 are passed to the message suitability assessment stage 303, where the messages 301 are looked at and analyzed for suitability (e.g., of being delivered as one or more audio messages) based on human factors such as those discussed above. For example, ones of the messages 301 with a large amount of jargon, complex statements, statements without actionable verbs, and incomplete statements may be removed (e.g., not converted into audio messages) or may be further processed as described herein to convert them into a form suitable for delivery as one or more audio messages. The message suitability assessment stage 303 may utilize various information in the message repository 330 for making the suitability assessment, where the message repository 330 may include previous or historical messages and their possible resolutions.

Ones of the messages 301 which are determined to be suitable for delivery as one or more audio messages in the message suitability assessment stage 303 are passed to the message processing stage 305. The message processing stage 305 utilizes various information from the repositories 350-1, 350-2, 350-3 and 350-4 for converting the messages 301 into audio messages. The jargon simplifier mapping repository 350-1, for example, may include one or more jargon processing dictionaries. In the jargon processing dictionaries, jargon (e.g., virtual disk rebuild, background initialization, etc.) are mapped or associated with simpler non-jargon terms or common familiar terms (e.g., virtual disk preparation, controller initialization, etc.). In cases where there are different heterogeneous elements in a network (e.g., from different vendors or competitors), jargon processing dictionaries may be created across such heterogeneous elements. For example, the terms "virtual disk," "virtual drive" and "logical unit" may refer to the same type of element, and may be mapped in a jargon processing dictionary to some common term (e.g., "virtual disk," "factory burn process," etc.). The common term may be selected as the type of term used by the organization or entity that implements the message processing system 110, the type of term used by an organization or entity that a target user is part of (e.g., which may be the same as or different than the organization or entity that operates the message processing system 110), etc.

In some embodiments, reinforcement learning is used to update and maintain the jargon processing dictionaries in the jargon simplifier mapping repository 350-1. For example, when a machine detects keywords that are not found in its jargon processing dictionaries, it may scan for "Definitions and Terms" sections inside a reference set of assets (e.g., user guides, white papers, podcasts, domain dictionaries, etc.) related to its particular business or technological domain. The business or technological domain may be determined from the transactional context, processes, conversational context, topic or sub-topic analysis, demographic interest, etc. The machine may update or rebuild the jargon dictionary to enrich it with newly acquired keywords. The reinforcement learning may base rewards on how much jargon gets translated into simpler terms.

The object simplifier mapping repository 350-2 may include one or more action verb dictionaries and/or one or more entity name dictionaries. In the action verb dictionaries, action verbs (e.g., replace, reinsert, reseat, reboot, restart, insert, export, secure, etc.) are converted into a dictionary. There may be, for example, 100 to 200 action verb words that are possible for a given technology (e.g., there may be different action verb dictionaries maintained for different technologies). Largely, some action verbs relate to lifecycle operations of entities that are present for all objects (e.g., new, install, create, delete, remove, set, modify, update, replace, get, view, show, list, etc.). Action verbs may differ from technology to technology and, similar to jargon, even within a given technology different organizations or competitors may use different terms for the same action. Action verbs or terms used by a particular organization or entity within a technology should be unambiguous (e.g., by virtue of usability and design principles). Action verbs in the action verb dictionary may be mapped to some common terms, and may have additional tags.

Some actions such as "is in normal state" and "is operational" are desired end states. These actions may be tagged as "success" and "final" and these states are associated with a desired end state name. Other actions like "failed," "not working," "is not optimal" and "exceeded warning threshold" are non-operational states. These actions may be tagged as "failed" and "final" and these states are associated with a desired end state name. Actions related to lifecycle operations (e.g., new, install, create, delete, remove, set, modify, update, replace, etc.) may be tagged as "lifecycle." Actions that are related to human or manual operations (e.g., reset, reseat, reboot, install a part, remove a part, replace a part, etc.) may be tagged as "human." Some actions require execution of tools (e.g., like "run" in the RACADM command-line utility tool, "run" in a PowerShell script, etc.). These actions are associated with the "tag" script and the actual script portion is extracted into the tag "execute." The tools may be identified using information maintained in the tool identifier mapping repository 350-3. Reinforcement learning may be used to update and maintain the action verb dictionaries in the object simplifier mapping repository 350-2. When the machine detects action verbs that are not found in its dictionary, it would scan for application programming interface (API) definitions, interface documents and message guides inside its reference set of assets. The reinforcement learning process is similar to that described above with respect to the jargon processing dictionaries of the jargon simplifier mapping repository 350-1.

The entity name dictionaries of the object simplifier mapping repository 350-2 may be built at runtime using data from actual deployment. Typically, the entity name dictionaries contain names, designations and identity attributes of various entities and objects in the system. These may include, but are not limited to, names of people, hostnames, IP addresses, employee identifiers, names of components, actual instances of processes, job identifiers, rack identifiers, location identifiers, phone numbers, etc. Such information may change during runtime and are usually difficult to parse. The entity name dictionaries may be built by pulling in all the entity names from various sources (e.g., through registrations, protocol walks, etc.). The entity name dictionaries may have entity type tokens which are associated with and identity different types of entity names (e.g., employee, sales manager, host, job, etc.). Reinforcement learning may be used to allow the system to update the entity name dictionaries continually by pulling entities from all known sources.

In the message processing stage 305, the textual content of the messages 301 is pre-processed for conversion into audio format. This may be done by analyzing the textual content of the messages 301, and splitting the textual content of the messages 301 along sentence boundaries or phrases separated by punctuation marks (e.g., ",", ".", "?", etc.) and conjunctions (e.g., "and," "or," "but," etc.). Commas may act as an aggregator (e.g., such as in "the issue could be with the server, chassis, or switch") where such words need to be collapsed into a single token (e.g., "the issue could be with <multiple word token>"). Consider, as an example, a given message with a paragraph of text containing two or more sentences. That paragraph may be split (e.g., using punctuation marks) to identify the two or more sentences, and each identified sentence may be converted, after further processing in the message processing stage 305 described below, into its own audio message for delivery to the user (e.g., using text-to-speech conversion tools in the message delivery stage 307).

For each identified sentence, any known jargon is replaced with common familiar terms from the jargon processing dictionaries maintained in the jargon simplifier mapping repository 350-1. During this replacement, it should be noted that in some cases multiple words (e.g., "virtual disk") may be considered as a single term. All names and designations in the sentences (e.g., Server 1, Rack 1, etc.) are replaced with entity type tokens using the entity name dictionaries maintained in the object simplifier mapping repository 350-2. All those names are put into a "name" bucket.

The modified sentences are then run through one or more natural language processing (NLP) algorithms. NLP processors can identify the parts of speech within the sentence, and can identify the primary verb which should be part of the action verb dictionary maintained in the object simplifier mapping repository 350-2. When the verb has the "final" tag, then the statement is created as: "<noun> is <end_desired_state_name_associated_with_verb>." Some examples are: system is operational; network is restored; drive is functional; drive is failed; system is down; etc. When the verb does not have the "final" tag, the verb and the noun are retained to frame a sentence with the verb followed by the noun. If the number of words in the sentence is below some designated threshold (e.g., no more than 5 words per sentence), then this would be well suited for an audio message. Now, additional information in the form of location is added, so "location" and the name or designation from the "name" bucket (e.g., which matches the noun selected for the sentence) are added.

When the verb has the "failed" tag, a mechanism is needed to restore the system to an operational state. Thus, a recovery step needs to be found along with a "need by time" for restoring the situation. The recovery step may be determined through analyzing information from the historical resolution data repository 350-4. This may include, for example, a message catalog or past tickets associated with historical messages. If this exists, the recommended action and recovery steps may be extracted from the message catalog or past tickets. The recovery steps will be played to the user after reporting the current failed state. To determine the "need by time" for recovery, SLAs may be analyzed to determine when the next job is going to start, or if the job has stopped or failed the process. If the job has stopped or failed the process, the "need by time" may be assumed to be a next time interval such as a next business day start time. This can be extracted from workflows, development and IT operations (DevOps) environments, through programmatic interfaces, etc. In case this is not a feasible, one or more heuristics may be used. One heuristic may be doubling the time taken to resolve the issue or the agreed IT SLAs for resolving these issues, let this time be T1. A prediction may be made as to the time taken to resolve similar kinds of issues from historical resolution data (e.g., obtained from the historical resolution data repository 350-4, such as through IT service management (ITSM) and trouble ticketing systems), let this be time T2. Thus, the action should have started at least (T1-T2). If this value is negative, then the action must have already started or should be escalated. The value of (T1-T2) may be rounded to the nearest hour, minute, or other desired time interval and represents the "need by time" for the action.

If there is more than one noun identified within a sentence, the noun which is associated with the verb is selected. If there is more than one noun associated with the verb, then the noun which is the most specific or represents the smallest identifiable component is selected. For example, consider the sentence "In the server, the virtual disk is heating up." In this case, "server" and "virtual disk" are both nouns. Among these, "virtual disk" is a more specific or smaller identifiable component than "server." As another example, consider the sentence "In the server, insert the physical drive." In this case, the "insert" verb is usually associated with replaceable components like "physical drive." Any messages that fail the above steps may be considered uninterpretable, and the algorithm may stop and the user may be sent the message (e.g., as-is, through another mechanism such as a text-based notification rather than an audio notification, etc.).

Analysis of server guide catalogs indicate that approximately 66% of messages in the catalogs can be converted into audio messages using the message processing stage 305. Not all messages are generated, since many of them include exceptional error situations indicative of use cases that normally do not occur in data centers. Analyzing 100 servers inside a data center, 90% of generated messages could be converted into audio messages safely. Of the recommended actions, 70% handle multiple simple sentences with each recommended action having 2 to 15 steps. Up to 70 independent scripts were identified from those recovery actions. Analysis of factory burn processes indicate that approximately 60% of messages can be converted into actionable audio messages. Such messages do not have a message catalog, and hence recommended actions are not derived from a message catalog. However, when integrated with trouble ticketing systems (e.g., ServiceNow, DevOps, etc.), the factory burn processes can be analyzed for deriving SLAs.

Message play of the processed messages 301 to the target user will now be described. To begin, a first sentence of the processed messages 301 is replayed to the target user. Verbs with the "success" tag are replayed as is, and the algorithm stops. In the case of other verbs (e.g., not having the "success" tag), a statement may be attached to the sentence (e.g., "Need to fix by <need-by-time>" with the <need-by-time> being determined as described above). When a verb has the "failed" tag, the rest of the sentences are removed and replaced with sentences of recommended actions associated with that message (e.g., for remediating the failure). Subsequent sentences are replayed to the target user one after another. The next sentence is replayed to the target user. If the target user prompts back with some confirmation message (e.g., "done," "next," etc.) then the next sentence (if any) will be replayed. If the target user prompts back to repeat the instructions (e.g., "repeat," "play again," etc.), then the sentence is repeated. When all statements are exhausted, then a final message may be played to the target user (e.g., "end of instructions," "no more steps are present," etc.).

If at any stage there is a "script" tagged verb, then the script is executed with the contextual parameters (e.g., that are available as part of the message, as well as the names/designations used) and the output is generated and returned to the target user in a message format. If the script is successful, then a success sentence may be generated (e.g., "tool <tool_name> executed successfully," etc.). If the script failed, a failure sentence may be generated (e.g., "tool <tool_name> failed," etc.). If the "need-by-time" for processing a message or one or more steps thereof expires, the system may generate and send a notification or message to an escalation manager or supervisor associated with the project.

In the message delivery stage 307, a preferred delivery device for a target user is determined. For example, a target user may be associated with multiple devices (e.g., one or more smartphones, tablets, wearable devices, smart speakers, etc.) that can be potentially used for delivery of audio messages to the target user. The target user may set one or more of such devices as "preferred" or provide a ranking or ordered list of preference of their devices to use for delivery of audio messages. It should also be appreciated that the delivery devices may include devices that are not unique to the target user. Consider, as an example, a target user that is servicing IT assets in a data center where the data center itself includes multiple devices capable of delivering audio messages. The preferred delivery device may be a given one of such multiple devices in the data center that are closest to the IT assets in the data center that are to be serviced by the target user, or which are along a path for navigating the target user towards the IT assets in the data center that are to be serviced by the target user. The message delivery stage 307 may further include determining whether the target user has any language preference. If the target user has a language preference which is different than the source language of the messages 301 to be delivered to that target user, then such messages 301 may be processed through a suitable translator. The processed messages 301 are then converted into audio format (e.g., using text-to-speech tools) and delivered to the target user.

In some embodiments, the message delivery stage 307 includes the system contacting the devices associated with the target user to look for supported audio technologies on such devices. This may be pre-provisioned according to the device type, device technology (e.g., Voice Extensible Markup Language (VoiceXML), Codecs, etc.) and a selected device transmission provider module. The module identifies the technologies (e.g., VoiceXML, Codecs, etc.) that are applicable in the device context. The processed messages 301 may be converted to a native or preferred language of the target user, and are then transmitted to the preferred device. Each sentence of the processed messages 301 may be transmitted to the device one at a time (e.g., as described above) to ensure that the target user can act on one action at a time.

Message bulletins are consolidated messages which may be replayed as an audio book at periodic intervals. The periodicity may be determined or set by the user. Users may also provide topics of interest, or the topics of interest may be discovered automatically by analyzing user behavior. Message bulletins may be used in various contexts, including but not limited to product launches and other promotional events. A process for generating a message bulletin for a specific target user will now be described. To begin, all nouns are grouped per verb. This ensures that all product launches or events, for example, are announced together. Within the nouns, the nouns are grouped together based on the domain (e.g., the "entity type token"). For example, all edge computing related product launches may be grouped together. Such groupings may be based on dictionary content in the object simplifier mapping repository 350-2 or another data store. The grouping may be manual, driven through automation, or combinations thereof. The message bulletin is generated by creating audio messages as follows: first, the verb followed by the entity type token is called out (e.g., "Product Launch for Edge Computing"); next, the nouns are announced with the data on which they were received (e.g., "Server Type A <verb> Nov. 10, 2021"); pause; and continue until all message are completed. The entire set of messages is converted into a single audio "book" or message bulletin that is published to target users at regular intervals.

Message bulletins may also be used for status content, such as for delivery to leadership teams within an organization or other enterprise. In this case, the status content is computed as statistics and converted into audio message bulletins. For this case, the algorithm may proceed by grouping all nouns per verb and then grouping the nouns based on the domain or entity type token as described above. The message bulletin is generated by creating audio messages as follows. For an entity type token, the total number of messages with verbs attached to or associated with a "success" tag is computed as "Total Success" and the total number of messages with verbs attached to or associated with a "failure" tag is computed as "Total Failed." The total number of messages, "Total," is then computed as a sum of "Total Success" and "Total Failed." The entity type token may be called out with the success and failure percentages (e.g., the percentage of "Total Success" and "Total Failed" in "Total"). The algorithm can be enhanced to include other tags as well. For clarity of illustration, tags like "success" and "failed" are identified as reportable tags which are included in the status content message bulletin. To provide percentages, like tags are grouped into enumerations (e.g., success and failed are enumerations of status). Enumerations can be reported in raw numbers, in percentages, in trends, etc. Again, "success" and "failed" are merely examples of status which can be reported. As another example, consider device health which may be reported using status indicators such as "Critical," "Warning," "Healthy," etc. Verbs with such device health tags can be used to report the numbers, percentages, etc. of elements with the different health status tags. Status enumerations may be reported (e.g., with pauses in between) until all message are completed. It should be noted that complex algorithms may require special handling. If there are algorithmic patterns that can leverage tags, they can be extended by incorporating such logic. The entire set of status messages is converted into a single audio "book" or message bulletin that is published to target users at regular intervals.

The technical solutions described herein provide numerous advantages in processing data in various technology spaces that use technical terms in notifications or messages. Conventional approaches, however, do not understand the semantics of those terms. This forces messages relayed by machines to require necessary manual intervention. The technical solutions described herein convert messages into an audio format which satisfies the audio retention capabilities of human beings. This conversion may include various preprocessing to convert the messages into simplified, actionable, imperative statements that can be acted on by users. Conventional approaches, in contrast, will read out messages "as-is" or as summaries which do not take into account the audio retention capabilities of human beings or convert messages into imperative (e.g., command oriented) language.

Illustrative embodiments may use dictionaries and tags to simplify the audio processing of messages and notification content that simplify user understanding. The audio processing also advantageously transfers the urgency and action needs by computing the "need-by-time" as part of the audio messages. Some embodiments further utilize novel NLP techniques for rendering any resolution (e.g., for failed issues) through simplified steps, enabling a user to navigate through each step at a time. Further, some embodiments avoid the need for recreating new message catalogs and instead provide technical solutions for processing existing message catalogs. This enables tool developers to publish message catalogs in audio form to leverage existing data, through consolidated bulletins at regular intervals.

The technical solutions described herein enable an organization or other enterprise to improve the productivity of its employees or other users. The technical solutions can be deployed across a variety of products, including products that provide support for service engineers in data centers. Such support products may include cloud-based support tools.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for conversion of messages into audio format will now be described in greater detail with reference to FIGS. 4 and 5. Although described in the context of system 100, these platforms may also be used to implement at least portions of other information processing systems in other embodiments.

Figure 4:
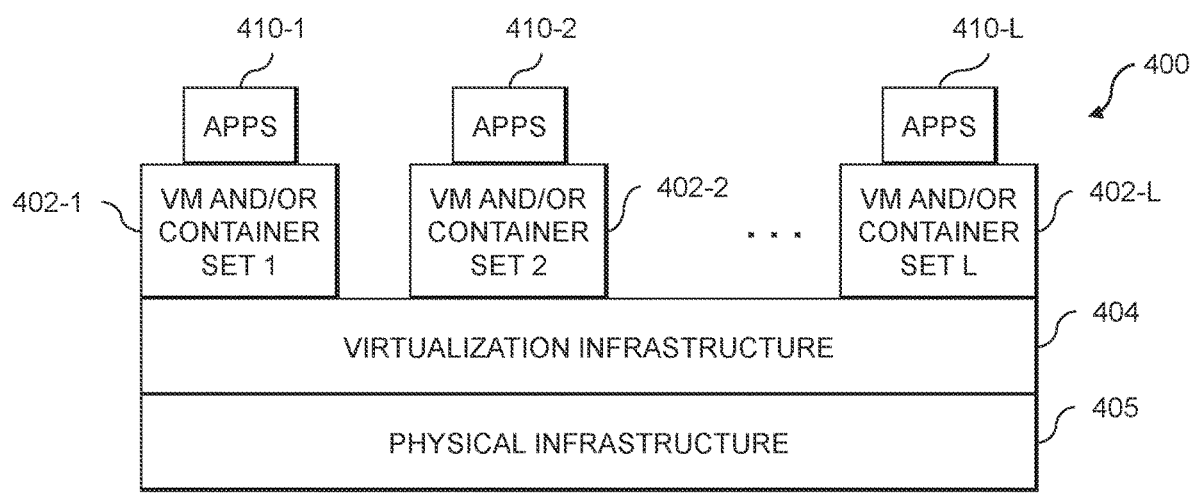
FIGS. 4 and 5 show examples of processing platforms that may be utilized to implement at least a portion of an information processing system in illustrative embodiments.
Figure 5:
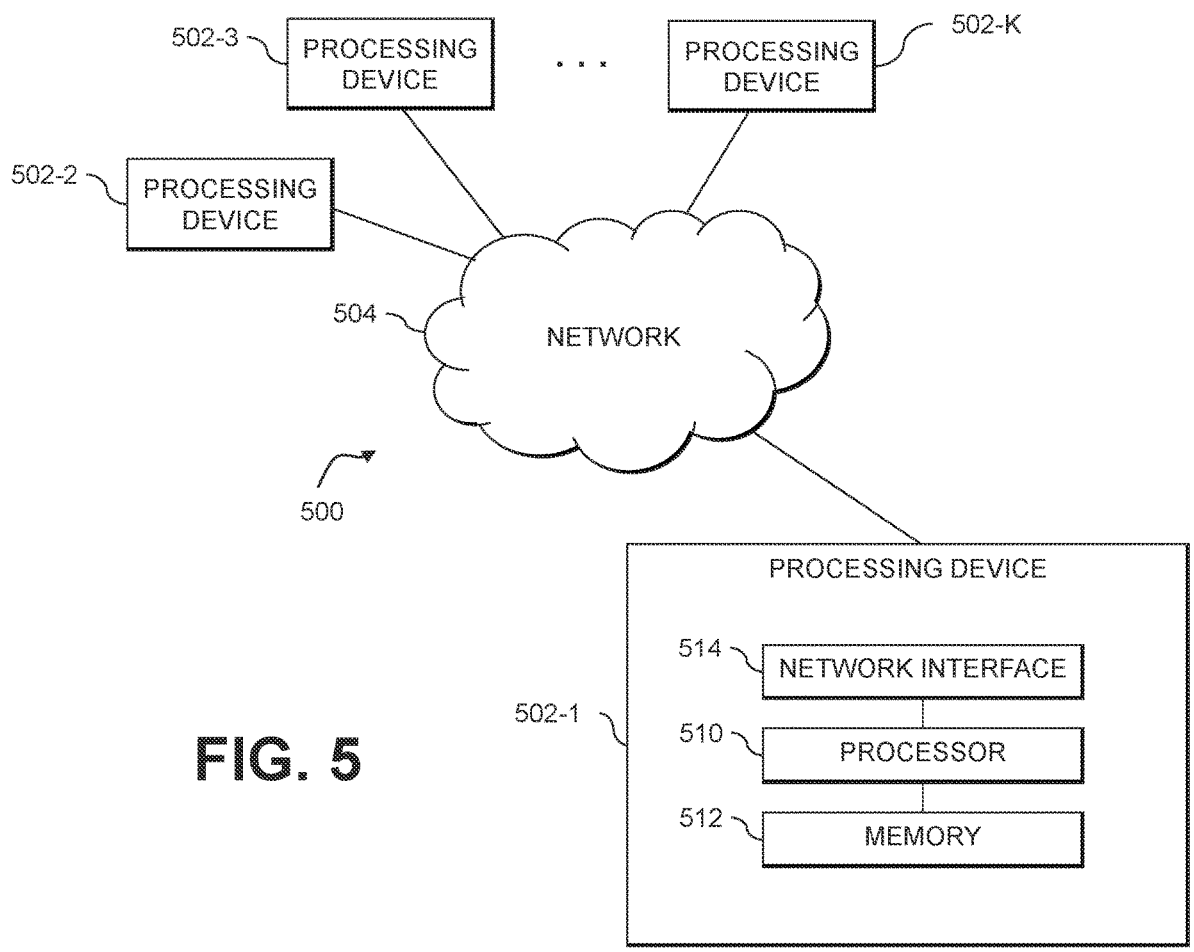

FIG. 4 shows an example processing platform comprising cloud infrastructure 400. The cloud infrastructure 400 comprises a combination of physical and virtual processing resources that may be utilized to implement at least a portion of the information processing system 100 in FIG. 1. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. A hypervisor platform may be used to implement a hypervisor within the virtualization infrastructure 404, where the hypervisor platform has an associated virtual infrastructure management system. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for conversion of messages into audio format as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, messages, notifications, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured to perform steps of:
        obtaining one or more messages, the one or more messages being associated with management of a given one of one or more information technology assets in an information technology infrastructure;
        determining, based at least in part on content of a given one of the one or more messages, whether the given message is suitable for delivery in an audio format;
        responsive to determining that the given message is suitable for delivery in the audio format, converting the content of the given message into one or more audio messages;
        selecting one or more audio output devices for delivery of the one or more audio messages; and
        providing, to the selected one or more audio output devices, the one or more audio messages;

wherein converting the content of the given message into the one or more audio messages comprises:

identifying, based at least in part on application of one or more natural language processing algorithms to the content of the given message, one or more operational states associated with the given information technology asset;

responsive to detecting that the identified one or more operational states represent one or more desired operational end states for the given information technology asset, generating at least one of the one or more audio messages indicating that the given information technology asset is in at least one of the one or more desired operational end states; and responsive to detecting that the identified one or more operational states do not represent at least one of the one or more desired operational end states, generating at least one of the one or more audio messages specifying one or more operations to be performed to transition the given information technology asset to at least one of the one or more desired operational end states.

2. The apparatus of claim 1 wherein determining whether the given message is suitable for delivery in the audio format comprises determining that the given message is not suitable for delivery in the audio format responsive to at least one of:

determining that the given message comprises an operational message without action steps;

determining that the given message comprises a non-actionable information message;

determining that the given message comprises partial instructions for an action to be taken for management of the given information technology asset.

3. The apparatus of claim 1 wherein determining whether the given message is suitable for delivery in the audio format comprises determining that the given message is not suitable for delivery in the audio format responsive to at least one of:

determining that the content of the given message comprises an amount of technical jargon terms exceeding a designated technical jargon threshold;

determining that the content of the given message comprises an amount of information exceeding a designated information threshold; and determining that a complexity of one or more sentences in the given message exceeds a designated complexity threshold.

4. The apparatus of claim 1 wherein determining whether the given message is suitable for delivery in the audio format comprises determining that the given message is suitable for delivery in the audio format responsive to at least one of:

determining that the content of the given message comprises an instruction message calling out one or more specific actions for management of the given information technology asset; and determining that the content of the given message comprises an actionable information message.

5. The apparatus of claim 1 wherein determining whether the given message is suitable for delivery in the audio format comprises determining that the given message is suitable for delivery in the audio format responsive to determining that the content of the given message comprises information associated with at least one of a product launch of the given information technology asset and a sales marketing event associated with the given information technology asset.

6. The apparatus of claim 1 wherein converting the content of the given message into one or more audio messages comprises identifying one or more technical jargon terms in the content of the given message and replacing the identified one or more technical jargon terms with one or more non-technical jargon terms, the one or more non-technical jargon terms being mapped to the identified one or more technical jargon terms in a jargon processing dictionary, the jargon processing dictionary being built utilizing a reinforcement learning algorithm that analyzes a set of reference assets related to a technical domain determined from analysis of a transactional context of the given message and the given information technology asset.

7. The apparatus of claim 1 wherein converting the content of the given message into one or more audio messages comprises identifying one or more action verbs in the content of the given message and utilizing an action verb dictionary to map the identified one or more action verbs to one or more action types, the one or more action types comprising at least a first action type representing at least one of the one or more desired operational end states of the given information technology asset, at least a second action type representing a failed non-operational end state of the given information technology asset, at least a third action type representing lifecycle operations for the given information technology asset, at least a fourth action type representing manual operations to be performed on the given information technology asset, and at least a fifth action type representing automated scriptable operations to be performed on the given information technology asset.

8. The apparatus of claim 1 wherein converting the content of the given message into one or more audio messages comprises identifying one or more entity names in the content of the given message and replacing the identified one or more entity names with one or more entity type tokens in an entity name dictionary, the entity name dictionary being built utilizing a reinforcement learning algorithm that analyzes a set of reference assets related to a technical domain determined from analysis of a transactional context of the given message and the given information technology asset.

9. The apparatus of claim 1 wherein converting the content of the given message into one or more audio messages comprises:

splitting textual content of the given message into one or more sentences based at least in part on one or more designated boundaries, the one or more designated boundaries comprising punctuation marks and conjunctions; and for a given one of the one or more sentences:

utilizing the one or more natural language processing algorithms to identify parts of speech of the terms in that sentence;

selecting a primary action verb in that sentence based at least in part on a transactional context of the given message and the given information technology asset; and determining an action type of the selected primary action verb in that sentence.

10. The apparatus of claim 9 wherein converting the content of the given message into the one or more audio messages comprises, responsive to the action type of the selected primary action verb representing at least one of the one or more desired operational end states of the given information technology asset, generating a given one of the one or more audio messages indicating that the given information technology asset is in said at least one of the one or more desired operational end states.

11. The apparatus of claim 9 wherein converting the content of the given message into the one or more audio messages comprises, responsive to the action type of the selected primary action verb representing a failed non-operational end state of the given information technology asset:
  determining one or more recovery steps for restoring the given information technology asset to at least one of the one or more desired operational end states;
  determining a recovery time by which the given information technology asset is to be restored to said at least one of the one or more desired operational end states; and
  generating a given one of the one or more audio messages indicating the determined one or more recovery steps and the determined recovery time.

12. The apparatus of claim 1 wherein converting the content of the given message into the one or more audio messages comprises consolidating the content of the given message with one or more other ones of the one or more messages into a message bulletin, the given message and the one or more other ones of the one or more messages being selected based at least in part on determining one or more topics of interest for a given user.

13. The apparatus of claim 12 wherein the message bulletin comprises a status report for management actions performed on the given information technology asset.

14. The apparatus of claim 1 wherein at least one of the selected one or more audio output devices comprises at least one of:
  a client device associated with a user responsible for management of the given information technology asset;
  the given information technology asset; and
  one or more other information technology assets in the information technology infrastructure within a designated threshold distance of the given information technology asset.

15. A computer program product comprising a non-transitory processor-readable storage medium having stored therein program code of one or more software programs, wherein the program code when executed by at least one processing device causes the at least one processing device to perform steps of:
  obtaining one or more messages, the one or more messages being associated with management of a given one of one or more information technology assets in an information technology infrastructure;
  determining, based at least in part on content of a given one of the one or more messages, whether the given message is suitable for delivery in an audio format;
  responsive to determining that the given message is suitable for delivery in the audio format, converting the content of the given message into one or more audio messages;
  selecting one or more audio output devices for delivery of the one or more audio messages; and
  providing, to the selected one or more audio output devices, the one or more audio messages;
  wherein converting the content of the given message into the one or more audio messages comprises:
    identifying, based at least in part on application of one or more natural language processing algorithms to the content of the given message, one or more operational states associated with the given information technology asset;
    responsive to detecting that the identified one or more operational states represent one or more desired operational end states for the given information technology asset, generating at least one of the one or more audio messages indicating that the given information technology asset is in at least one of the one or more desired operational end states; and
    responsive to detecting that the identified one or more operational states do not represent at least one of the one or more desired operational end states, generating at least one of the one or more audio messages specifying one or more operations to be performed to transition the given information technology asset to at least one of the one or more desired operational end states.

16. The computer program product of claim 15 wherein converting the content of the given message into one or more audio messages comprises:
  splitting the given message into one or more sentences based at least in part on one or more designated boundaries, the one or more designated boundaries comprising punctuation marks and conjunctions; and
  for a given one of the one or more sentences:
    utilizing the one or more natural language processing algorithms to identify parts of speech of the terms in that sentence;
    selecting a primary action verb in that sentence based at least in part on a transactional context of the given message and the given information technology asset; and
    determining an action type of the selected primary action verb in that sentence.

17. The computer program product of claim 16 wherein converting the content of the given message into the one or more audio messages comprises:
  responsive to the action type of the selected primary action verb representing at least one of the one or more desired operational end states of the given information technology asset, generating a given one of the one or more audio messages indicating that the given information technology asset is in said at least one of the one or more desired operational end states; and
  responsive to the action type of the selected primary action verb representing a failed non-operational end state of the given information technology asset:
    determining one or more recovery steps for restoring the given information technology asset to said at least one of the one or more desired operational end states;
    determining a recovery time by which the given information technology asset is to be restored to said at least one of the one or more desired operational end states; and
    generating a given one of the one or more audio messages indicating the determined one or more recovery steps and the determined recovery time.

18. A method comprising:
  obtaining one or more messages, the one or more messages being associated with management of a given one of one or more information technology assets in an information technology infrastructure;
  determining, based at least in part on content of a given one of the one or more messages, whether the given message is suitable for delivery in an audio format;
  responsive to determining that the given message is suitable for delivery in the audio format, converting the content of the given message into one or more audio messages;
  selecting one or more audio output devices for delivery of the one or more audio messages; and providing, to the selected one or more audio output devices, the one or more audio messages;

wherein converting the content of the given message into the one or more audio messages comprises:

identifying, based at least in part on application of one or more natural language processing algorithms to the content of the given message, one or more operational states associated with the given information technology asset;

responsive to detecting that the identified one or more operational states represent one or more desired operational end states for the given information technology asset, generating at least one of the one or more audio messages indicating that the given information technology asset is in at least one of the one or more desired operational end states; and responsive to detecting that the identified one or more operational states do not represent at least one of the one or more desired operational end states, generating at least one of the one or more audio messages specifying one or more operations to be performed to transition the given information technology asset to at least one of the one or more desired operational end states; and wherein the method is performed by at least one processing device comprising a processor coupled to a memory.

19. The method of claim 18 wherein converting the content of the given message into one or more audio messages comprises:

splitting the given message into one or more sentences based at least in part on one or more designated boundaries, the one or more designated boundaries comprising punctuation marks and conjunctions; and for a given one of the one or more sentences:

utilizing the one or more natural language processing algorithms to identify parts of speech of the terms in that sentence;

selecting a primary action verb in that sentence based at least in part on a transactional context of the given message and the given information technology asset; and determining an action type of the selected primary action verb in that sentence.

20. The method of claim 19 wherein converting the content of the given message into the one or more audio messages comprises:

responsive to the action type of the selected primary action verb representing at least one of the one or more desired operational end states of the given information technology asset, generating a given one of the one or more audio messages indicating that the given information technology asset is in said at least one of the one or more desired operational end states; and responsive to the action type of the selected primary action verb representing a failed non-operational end state of the given information technology asset:

determining one or more recovery steps for restoring the given information technology asset to said at least one of the one or more desired operational end states;

determining a recovery time by which the given information technology asset is to be restored to said at least one of the one or more desired operational end states; and generating a given one of the one or more audio messages indicating the determined one or more recovery steps and the determined recovery time.

* * * * *